Dec. 1, 1964   G. L. MITTELSTEADT   3,159,226
BEAM SHIFTING MECHANISM
Filed March 12, 1963

INVENTOR.
GLEN L. MITTELSTEADT
BY Williamson & Palmatier
ATTONEYS 3,159,226
BEAM SHIFTING MECHANISM
Glen L. Mittelsteadt, Waseca, Minn., assignor to Herter's
Inc., Waseca, Minn., a corporation of Minnesota
Filed Mar. 12, 1963, Ser. No. 264,548
3 Claims. (Cl. 177—157)

This invention relates to a scale device and more particularly to a beam elevator mechanism for use in shifting the balance beam of a conventional scale device into and out of weight determining relation with respect to the material or object to be weighed.

An object of this invention is the provision in a scale device of a novel beam elevating lever mechanism, of simple and inexpensive construction, which is shiftable into and out of engaging relation with the balance beam of the scale to shift the balance beam into and out of a weight determining operative position.

Another object of this invention is to provide a novel and improved beam elevating lever mechanism including a generally U-shaped beam engaging portion which is vertically swingable into engaging relation with the balance beam of the scale device to shift the balance beam out of operative weight balancing relation during the weighing operation.

A further object of this invention is to provide a novel and improved beam elevating lever mechanism, readily adaptable for any conventional scale device, and which includes a U-shaped beam engaging portion and a handle portion, the beam engaging portion being positioned between and pivotally mounted on the upstanding supporting elements of the scale device, and being vertically swingable to very effectively shift the balance beam between an elevated inoperative position and a lowered weight balance operative position during the weighing operation.

Figure 1:
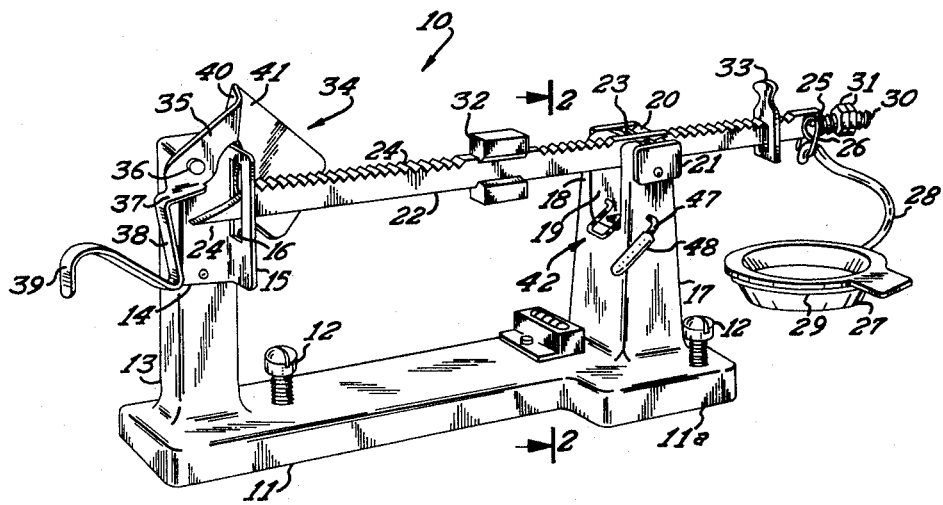
Figure 2:
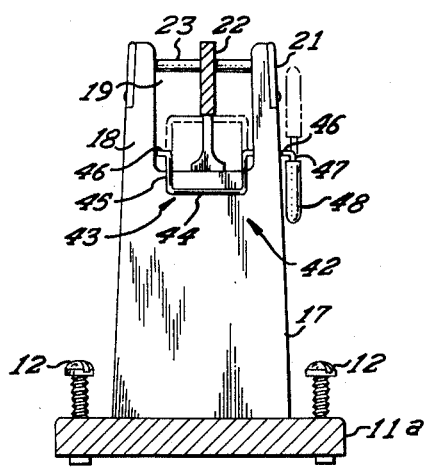

These and other objects and advantages of my invention will more fully appear from the following description made in connection with the accompanying drawings wherein like character references refer to the same or similar parts throughout the several views, and in which:

FIG. 1 is a perspective view of a scale device incorporating my novel beam elevating lever mechanism; and FIG. 2 is a vertical sectional view thereof taken approximately along line 2—2 of FIG. 1 and looking in the direction of the arrows, certain parts thereof being illustrated in adjusted position by dotted line configuration.

Referring now to the drawings, it will be seen that a scale device, designated in its entirety by the reference numeral 10, is there shown. This scale device includes a base 11 which is preferably constructed of a suitable metallic material such as steel or the like. It will be noted that the base 11 is of generally rectangular construction having an enlarged portion 11a at one end thereof. A plurality of adjustable foot support elements 12 threadedly engage the base 11 and are adjustable to project therethrough. It is pointed out that in the embodiment shown three such foot support elements 12 are illustrated thereby providing a three-point support for the base 11.

An elongate support member 13 is integrally formed with the base 11 adjacent one end thereof and projects upwardly therefrom as best seen in FIG. 1. Rigidly affixed to this upstanding support member 13 is a substantially rectangular beam guide and retaining plate 14 which is bent to define an angularly disposed portion 15, the latter being provided with an elongate vertically disposed aperture 16 therein. This plate 14 is preferably constructed of a suitable rigid material such as aluminum or the like and is secured to the support member 13 by any suitable securing means such as bolts. The plate 14 will have its exposed face provided with a vertically disposed calibrated scale having suitable indicia to represent the point at which the scale beam will be in weight balancing relation. To this end it will be noted that the scale balance beam projects through the opening 16 in the angular portion 15 of the plate 14.

The base 11 also has another support member 17 affixed to the enlarged end portion 11a to project upwardly therefrom. It will be seen that the upper end portion of the support member 17 is bifurcated to define a pair of laterally spaced apart beam supporting elements 18, the space between the beam supporting elements 18 being designated by the reference numeral 19. Each of the beam supporting elements 18 has a V-shaped recess 20 formed in the upper end thereof for receiving the knife edge fulcrum element of the balance beam in a manner to be described hereinbelow. The respective outer surfaces of each of the beam supporting elements 18 are provided with closure side plates 21 which are disposed in obstructing relation with respect to the outer ends of the V-shaped recesses 20.

It will be seen that the scale device 10 includes an elongate generally horizontally oriented balance beam 22 which is provided with opposed laterally extending knife edge fulcrum elements 23. It will be noted that these knife edge fulcrum elements 23 are located intermediate the ends of the balance beam 22 and are received within and cooperate with the V-shaped fulcrum recesses 20 to permit vertical pivoting movement of the scale beam during the weighing operation.

The upper longitudinal edge 24 of the balance beam 22 is serrated in a well known manner while the lower edge thereof is substantially straight and smooth. The end portion of the balance beam 22 which projects through the opening 16 of the angularly bent portion of the plate 14 defines a pointer 24, the pointer cooperating with the indicia on the plate 14 to indicate when the balance beam 22 is in a balanced condition during the weighing operation.

The opposite end of the balance beam 22 has a pair of oppositely disposed laterally projecting lugs 25 affixed thereto to which is pivotally suspended a hanger element 26. A weighing pan 27 which is preferably constructed of a suitable metallic material such as aluminum or the like is suspended from the hanger element 26 by means of a pan-supporting suspension structure 28 which is of suitable metallic wire construction. It will be noted that this pan-supporting suspension structure 28 has its lower end portion thereof bent to define an annular ring 29 for receiving and supporting the weighing pan 27 therein. It will also be noted that the pan-supporting suspension structure 28 is of arcuate configuration and has its upper end thereof detachably connected with the hanger element 26.

The end portion of the balance beam 22 from whence the weighing pan 27 is suspended is also provided with a longitudinally extending threaded projection 30 which is suitably threadedly engaged by a pair of nuts 31, this nut and bolt unit serving to permit the balance beam to be adjusted in a well known manner. The balance beam 22 is also provided with a relatively large weight element 32 which is slidable along the balance beam 22 during the weighing operation. It will be noted that this weight element 32 is positioned on the balance beam 22 between the support members 13 and 17. A smaller weight element 33 is slidably mounted on the balance beam but is positioned on that end portion of the balance beam between the support member 17 and the end of the balance beam from whence the weighing pan 27 is suspended.

Means are also provided for stabilizing the balance beam 22 against oscillating movement during the weighing operation and for positioning the balance beam in a balanced position. This stabilizer mechanism is designated generally by the reference numeral 34 and is preferably of integral construction and may be formed from a suitable metallic material such as aluminum or the like. It is pointed out that this stabilizer mechanism 34 is of the type described and claimed in my co-pending application Serial No. 173,792, now Patent No. 3,121,466, filed February 6, 1962. It will be seen that the stabilizer mechanism includes a substantially flat attachment plate 35 which is pivotally connected to the upstanding support member 13 by a pivot pin 36. Affixed to the lower terminal portion of the attachment plate 35 is a substantially flat upper beam pointer engaging element 37 which is rigidly connected at one end to a substantially flat lower beam pointer engaging element 38. The beam pointer engaging elements 37 and 38 form an acute angle for engaging and restricting movement of the pointer 24.

The lower terminal portion of the beam pointer engaging element 38 has an elongate hand actuating element 39 affixed thereto and which may be grabbed by a user to facilitate pivoting of the stabilizer mechanism. The upper terminal portion of the attachment plate 35 is laterally off-set as at 40 and this laterally off-set portion has integrally formed therewith a counterweight element which serves as a means for normally urging the V-shaped socket member into the position illustrated in FIG. 1. It is also pointed out however, that this stabilizer mechanism may be moved about the pivot 36 until the apex of the V-shaped socket member will embrace the pointer 24 of the balance beam 22 therein, and will position the pointer element 24 in a weight balancing position. It is pointed out that the scale device 10 functions in the manner of the conventional scale devices whereby the balance beam 22 may be shifted between an elevated inoperative and a lowered operative position. When in the lowered operative position, the knife edge fulcrum elements 23 will be disposed in engaging relation in the V-shaped recesses 20 so that the balance beam will be supported from the supporting elements 18. The balance beam 22 then constitutes a lever wherein the respective weights and material to be weighed constituting the work and effort of such a lever. When the scale device is not being used and during adjustment of the balance weights as well as the addition or removal of material from the pan 27, the balance beam will be shifted to the elevated inoperative position.

Means for shifting the balance beam 22 between the elevated inoperative and the lowered operative positions comprises a beam shifting lever mechanism 42. This beam shifting lever mechanism 42 includes a U-shaped portion 43 comprised of a web element 44 and a pair of leg elements 45. Each of the leg elements 45 have their ends bent at right angles to define pivot elements 46, the latter projecting into suitable apertures formed in the supporting elements 18. It will be seen that one of the pivot elements 46 projects through the associated supporting element 18 and is provided with a handle portion or element 47, the latter being provided with a suitable cover 48 which is preferably constructed of a resilient material such as rubber or the like.

It will be seen that the beam shifting lever mechanism is of single piece integral construction and is preferably constructed of a metallic wire material. The pivot elements 46 permit vertical swinging of the U-shaped portion 43 about a substantially transverse axis whereby the web element 44 will engage the lower surface of the balance beam 22 to shift the balance beam vertically to the elevated inoperative position. Downward movement of the U-shaped portion 43 permits lowering of the balance beam 22 to the operative position wherein the knife edge fulcrum elements are pivotally supported within the V-shaped recesses 20. The axis of pivot of the lever mechanism 42 is defined by the pivot elements 46, the latter being arranged in longitudinal alignment. Thus it will be seen that the beam shifting lever mechanism 42 very effectively permits raising and lowering of the balance beam 22 between the inoperative and operative positions. The single piece integral construction of the balance beam lever mechanism permits this mechanism to be inexpensively constructed and also permits incorporation of the mechanism into most of the scale devices employing a balance beam of the type illustrated in the drawing.

The particular scale device illustrated is especially adapted for use in weighing gun powder for a reloading operation. Because of its unique construction, my novel beam shifting lever mechanism may be readily swung to raise and lower the balance beam when the material such as gun powder is being weighed. It will therefore be seen that such a reloading process contemplates a repeated weighing operation in which a predetermined amount of gun powder must be accurately measured for loading each round. It has been found that my novel beam shifting lever mechanism lends itself to this type of weighing operation.

From the foregoing description, it will be seen that I have provided a novel beam shifting lever mechanism which may be readily incorporated on any conventional scale device and which is operable to very quickly and effectively shift the conventional balance beam between an elevated inoperative position and a lowered weight balancing operative position.

It will also be seen from the preceding paragraphs that my novel beam shifting lever mechanism is of single piece integral construction and may thereby be very inexpensively manufactured.

Thus it will be seen that I have provided a novel beam shift lever mechanism which is not only of simple and inexpensive construction, but one which functions in a more efficient manner than any heretofore known comparable devices.

It will of course be understood that various changes may be made in the form, details, arrangement and proportions of the various parts without departing from the scope of my invention.

What is claimed is:
1. In a scale device comprising a base,
   a pair of spaced apart beam supporting elements rigidly connected with said base and projecting upwardly therefrom,
   an elongated generally horizontally oriented balance beam positioned between said supporting elements and being vertically shiftable relative thereto between an elevated inoperative position and a lowered operative position, said balance beam having a fulcrum element carried thereby engageable with said supporting elements when said balance beam is in the lowered operative position, and being disengageable from said supporting elements when said balance beam is shifted to the inoperative position,
   and a beam elevating lever positioned between and pivotally mounted on said supporting elements for vertical swinging movement relative thereto about a substantially horizontal axis, said lever including a beam engaging portion for engaging the balance beam during upward swinging movement of the lever to shift the beam into said elevated inoperative position,
   and a handle portion connected to said beam engaging portion for facilitating swinging movement thereof.
2. In a scale device comprising a base,
   a pair of spaced apart beam supporting elements rigidly connected with said base and projecting upwardly therefrom,
   an elongated generally horizontally oriented balance beam positioned between said supporting elements, and being vertically shiftable relative thereto between an elevated inoperative position and a lowered operative position, said balance beam having a fulcrum element carried thereby engageable with said supporting elements when said balance beam is in the lowered operative position, said fulcrum ele- ment being disengageable from said supporting elements when said balance beam is shifted to the inoperative position, and an integral single piece beam elevating lever mechanism including a U-shaped portion positioned between and pivotally mounted on said supporting elements for vertical swinging movement relative thereto about a substantially horizontal axis, said U-shaped portion including a beam engaging element for engaging the balance beam during upward swinging movement of the U-shaped portion to shift the beam into said elevated inoperative position, and a handle portion rigidly connected to said beam engaging portion for facilitating swinging movement thereof.

3. In a scale device comprising a base, a pair of laterally spaced apart, beam supporting elements rigidly connected with said base and projecting upwardly therefrom, an elongate generally horizontally oriented balance beam positioned between said supporting elements and being vertically shiftable relative thereto between an elevated inoperative position and a lowered operative position, said balance beam having a fulcrum element carried thereby engageable with said supporting element when said balance beam is in the lowered operative position, and being disengageable from said supporting elements when said balance beam is shifted to the inoperative position, and a beam elevating lever mechanism for shifting said beam between said operative and inoperative positions, said lever mechanism including a U-shaped portion positioned between and swingably mounted on said supporting elements for vertical swinging movement relative thereto about a substantially horizontal axis, a pair of pivot elements integrally formed with said U-shaped portion and each being pivotally received within a recess in one of said supporting elements, and a handle portion integrally formed with one of said pivotal elements for facilitating swinging movement of said U-shaped portion.

References Cited in the file of this patent
UNITED STATES PATENTS

| | | |
|---|---|---|
| 1,195,719 | Pfeiffer | Aug. 22, 1916 |
| 1,584,380 | Krabbendam et al. | May 11, 1926 |
| 3,027,955 | McCown | Apr. 3, 1962 |
| 3,106,977 | Wells | Oct. 15, 1963 |

FOREIGN PATENTS

| | | |
|---|---|---|
| 105,744 | Switzerland | July 1, 1924 |